United States Patent [19]
Hashida et al.

[11] 3,874,436
[45] Apr. 1, 1975

[54] RADIAL-PLY TIRE WITH STEEL AND TEXTILE BREAKER

[75] Inventors: Taizo Hashida, Nishinomiya; Shoji Miyoshi, Osaka; Hiroyasu Fujishima, Osaka; Masaru Okumura, Osaka, all of Japan

[73] Assignee: Toyo Rubber Industry Co., Ltd., Osaka-shi, Osaka, Japan

[22] Filed: July 24, 1972

[21] Appl. No.: 274,386

[30] Foreign Application Priority Data
July 23, 1971 Japan................. 46-55069
Aug. 10, 1971 Japan................. 46-60875

[52] U.S. Cl............................ 152/361 DM, 152/356
[51] Int. Cl. ............................................. B60c 9/16
[58] Field of Search..... 152/361 DM, 339, 356, 354

[56] References Cited
UNITED STATES PATENTS

| | | |
|---|---|---|
| 3,126,042 | 3/1964 | Cegnar........................ 152/361 DM |
| 3,131,744 | 5/1964 | Boussu et al................ 152/361 DM |
| 3,205,931 | 9/1965 | Keefe, Jr....................... 152/361 R |
| 3,242,965 | 3/1966 | Mirtain........................ 152/361 DM |
| 3,503,432 | 3/1970 | Maiocchi..................... 152/361 DM |
| 3,597,303 | 8/1971 | Tanaka............................... 152/359 |
| 3,672,423 | 6/1972 | Duduk................................. 152/359 |
| 3,674,078 | 7/1972 | Sasaki et al........................ 152/354 |
| 3,690,364 | 12/1972 | Barassi et al................ 152/361 DM |

Primary Examiner—Robert S. Ward, Jr.
Assistant Examiner—Reinhard J. Eisenzopf
Attorney, Agent, or Firm—Sughrue, Rothwell, Mion, Zinn and Macpeak

[57] ABSTRACT

A radial-ply tire having high speed durability improved cornering properties and abrasion resistance and retaining good riding comfort, wherein the breaker layer consists of inner layers of steel cords angled with respect to the equatorial line of the tire and outer layers of textile cords angled with respect to the equatorial line of the tire.

3 Claims, 5 Drawing Figures

RADIAL-PLY TIRE WITH STEEL AND TEXTILE BREAKER

BACKGROUND OF THE INVENTION

1. Field of the Invention

This invention relates to an improvement in a radial-ply tire containing a breaker layer of textile cords, and provides a radial-ply tire having markedly improved abrasion resistance and cornering properties as well as improved high speed safety and durability, at relatively low cost and without impairing the riding comfort.

In this specification, the term "a radial ply tire" refers to a pneumatic tire having a carcass comprising plies of cords disposed radially or substantially radially of the tire.

2. Description of the Prior Art

Generally, radial-ply tires previously have been either of a Structure A comprising a carcass layer of rayon cords or nylon cords and a breaker layer of rayon cords or of a Structure B comprising a carcass layer of rayon cords and a breaker layer of steel cords. Those of the Structure A have very poor abrasion resistance and cornering properties, but superior high speed durability and riding comfort, and can be obtained at low cost. On the other hand, those of the Structure B have outstandingly superior abrasion resistance and cornering properties but poor high speed durability and riding comfort, and the cost of production of such tires is high.

Radial ply tires have numerous advantages as compared with conventional tires in which carcass plies are disposed obliquely in relation to the mid-circumferential line of the tire due to their own inherent constructions with respect to good running properties at a high speed, wear resistance and cornering properties, and a low rolling resistance. A conventional combination of cord materials which have been used to the greatest extent for radial ply tires encompasses rayon or nylon cord as the carcass plies in a carcass layer and rayon or steel cord as belt plies in a breaker layer as described above. However, it was found, as a result of detailed tests, that the radial ply tires constructed by the respective combinations as indicated above had the following drawbacks.

First, the cord material for the carcass plies is described. It is, of course, possible to manufacture radial ply tires which are sufficiently durable for the purposes of practical utilization by using rayon cords as the carcass plies. When the tires are utilized for a high speed running at a velocity in excess of 200 Km/hour, it was, however, found that a separation and breakdown in an early stage of the running of the tires occurs. In this respect, nylon cord is much superior to rayon cord, since it is confirmed that for tires of nylon cord safe running is made possible at high speeds over 200 Km/hour without giving rise to separation and breakdown after a running for a long period of time, but, as is well known, nylon materials have a Young's modulus considerably lower than that of rayon materials, so that these tires are lacking in dimensional stability and have greatly decreased cornering properties and transverse rigidity. On the other hand, one serious defect of a rayon cord is its high water absorbency. On account of this, once water or rainwater penetrates into the carcass layer of the radial ply tire from a break or cut in the sidewall zone, the strength of it is remarkably decreased.

Further, in case of radial ply tires, its fatigue characteristic is particularly of interest, since radial ply tires have a spring constant lower than that of ordinary tires by more than 10 percent and hence, they undergo greater bending when loads are imposed upon them during running. Therefore, the fatigue properties of ply cord materials in radial ply tires must also be taken into consideration sufficiently as well as that of the tires themselves, since the service life of the tires is enhanced with an increase in tread wear. A rayon cord can have sufficient strength to last until the end of the first service life of the tire (until the first retreading), but it necessarily does not have enough strength for repeated retreadings because of the fatigue resulting from repeated bendings.

In the next place, the cord material for the belt plies of the breaker layer is discussed. When rayon cord is employed for the belt plies, it is possible to provide radial ply tires sufficiently durable for practical use as in the case of the cords of the carcass plies. However, it was found that adhesion between the rayon cord and rubber compound in which the cord is embedded is not completely sufficient when the tires are run continuously at a speed of over 200 Km/hour because separation and breakdown at an early stage of the running take place. This tendency is even greater when the rayon cord is of a type having a high water content. The dependency of the water content of a cord material upon high speed durability of a radial ply tire is greater in case of the cords of the breaker layer than in case of the cords of the carcass plies. When the water content of the breaker cords is in excess of 4 to 5 percent by weight, the durability of the tire is decreased markedly. The water content of the generally used rayon cord in the standard state (as prescribed in Japanese Industrial Standards Z 8,703) ranges from 12 to 14 percent by weight. Accordingly, in order to control the water content of the rayon cord at 4 to 5 percent by weight, it is necessary to keep it at extremely low temperature conditions or to dry it in a suitable drying device. Taking the manufacturing process of tires into consideration, the precautions of controlling the water content are too difficult to practice and require very great expense. In this regard, nylon cord is more advantageous, having a water content in the standard state of from 3.5 to 5.0 percent by weight. However, it has a considerably lower Young's modulus than rayon cord which is the most important characteristic as the breaker cords and hence, wear resistance and cornering property of the tire comprised of it are greatly decreased. Thus, there is little advantage in radial ply tires comprised of nylon breaker cords. Such is the case with outer synthetic textile fibers having lower Young's moduli than nylon. A further defect of rayon cords as the breaker layer consists in a poor water resistance. When the tread portion of a tire comprised of rayon cords in the breaker layer is cut or broken by an obstacle on the road or ground and rainwater or the like penetrates from the cut part into the inner breaker layer, the cord strength and adhesion between the cords and rubber compound in that part are decreased to less than about a half, respectively, and as a consequence this leads to an early breakdown of the tire. Even though the rayon cord has a high Young's modulus, which is less than about one-seventh of that of steel cord, and wear resistance and cornering properties of the tire are in practical ranges for utilization, an obstacle decisevely exists in further enhancing these characteristics particularly.

Steel cord as a breaker material of the radial ply tire has also various problems as hereinafter described. Steel cord has a much higher Young's modulus in comparison with other organic (synthetic or natural) fibers as referred to above, and acoordingly, a tire comprised thereof has a extremely good wear resistance and cornering properties. On the contrary, it has been found that it has also fairly serious drawbacks. That is to say, the tire may be sufficient for use from a practical standpoint, but when it is run at a high speed of 200 Km/hour, separation and breakdown occur at an early stage of the running since adhesion between the cord and rubber compound is not completely sufficient. Furthermore, where the tread portion of the tire suffers a cut or break by an obstacle on the road or ground, the steel cord soon becomes corroded when rainwater or the like penetrates from the cut into it.

Thus, as it can be seen from the detailed description above, radial ply tires constructed of various combinations of cord materials as used in general and which are well-known at present may be sufficient for pracical purposes, but they are still insufficient particularly when durability at a high speed over 200 Km/hour is considered important and is required while the inherent advantages of radial ply tires are retained. The radial ply tires produced heretofore have been lacking in a sufficient high speed durability.

Accordingly, a primary object of the present invention is to provide a radial ply tire having a good safety and durability in the running thereof at a high speed for a long period of time without any separation and breakdown.

Another object of the present invention is to provide a radially plied tire additionally having a good wear resistance, cornering properties and riding comfort.

Other objects of the invention will be obvious from the contents of the specification hereinafter disclosed.

SUMMARY OF THE INVENTION

Accordingly, this invention provides for the elimination of the above-described defects, and provides a radial-ply tire of improved abrasion resistance, cornering properties and high speed durability in which a breaker layer between the carcass layer and the tread portion comprises a specified combination of textile fiber cords having an angle of inclination of 10° to 20° with respect to the equatorial line of the tire and steel cords having a specific angle of inclination with respect to the equatorial line of the tire.

BRIEF DESCRIPTION OF THE ACCOMPANYING DRAWINGS

Embodiments of the invention are shown by reference to the accompanying drawings in which.

DETAILED DESCRIPTION OF THE INVENTION

Figure 1:
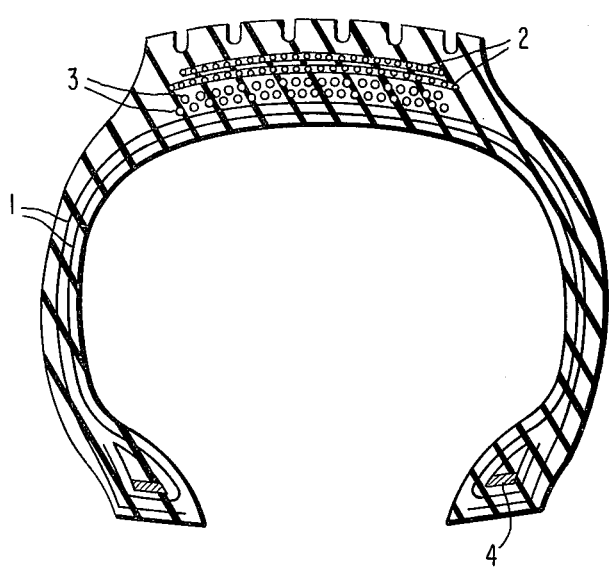
FIG. 1 is a partial sectional view of one example of a radial-ply tire in accordance with this invention.

According to the radial ply tire of the invention, it is necessary that the cords of belt plies in the breaker layer to be combined with the aforesaid textile cords in the carcass layer be constituted by two superposed groups: (1) two plies of steel cords, each ply of which is disposed in an opposite direction to the other so as to cross with each other at a definite angle with respect to the mid-circumferential or equatorial line of the tire and (2) plies of textile fiber cords which are disposed outside the plies of the steel cords in relation to the radial direction of the tire so as to cross mutually in opposite directions at a definite angle in a range of from 10° to 20° with respect to the mid-circumferential line of the tire, the successive plies of the two groups thus being, as a whole, disposed in a layered alternative fashion with respect to the mid-circumferential line of the tire.

If the breaker layer of the tire according to this invention is comprised only of the steel cords, the tread portion of the tire thus constructed has such a high rigidity that the tread portion is poor in a shock absorbing properties, the shock resulting from obstacles on the road or the ground during the running, which leads to an uncomfortable ride, and tends to be externally impaired. If the impaired part in the tread portion is deep and reaches the steel cords, water or rainwater penetrates and causes them to corrode which results in breakdown of the tire. Furthermore, stresses resulting from external forces imposed on the tire during the running concentrates at the interface of the rubber compound and the steel cords embedded therein, so that a separation phenomenon due to insufficient adhesion between the steel cords and the rubber compound often takes place. As a result of numerous investigations on steel cords, it became possible to obtain a radial ply tire having good performances according to this invention, as above described, by further arranging a ply or plies of textile fiber cords adjacent the plies of the steel cords in relation to the radial direction of the tire at an angle within a range of from 10° to 20° with respect to the mid-circumferential line of the tire.

In the structure of a breaker layer in the radial-ply tire according to the present invention, the employment of steel cord results in a large strength for the tread portion, but due to the small strength in the lateral direction, a lack of balance in the strength results in the steel cord layer and thereby various undesirable effects such as fatigue of the steel cord layer are enlarged by the deformation of tire.

Specifically, a single steel cord layer tends to increase this lack of balance in strength, and in order to remove this disadvantage an integral textile cord layer has been bent into a U-shape so that there is an overlap of the layer and applied adjacent the steel cord layer, e.g., in an outside or an inside portion or in an outside and an inside portion of the steel cord layer but even with this construction it is impossible to remove completely the lack of balance in strength in the steel cord layer. Consequently, separate textile cord layers are applied in an outside portion of a breaker layers having two steel cord layers as shown in the present invention, and the desired purpose and effect for steel cord layer can be accomplished and good balance in strength can be obtained. Also, the steel cord layer is protected.

Referring to the drawings in detail, FIG. 1 shows one example of a radial ply tire constructed in accordance with the invention comprising textile fiber cords (1) as a radial ply in a carcass layer, textile fiber cords (2) in a breaker layer, steel cords (3) in a breaker layer and bead wires (4), in the exemplary figure of which the carcass layer consists of two plies and the breaker layer consists of four plies.

Figure 2:
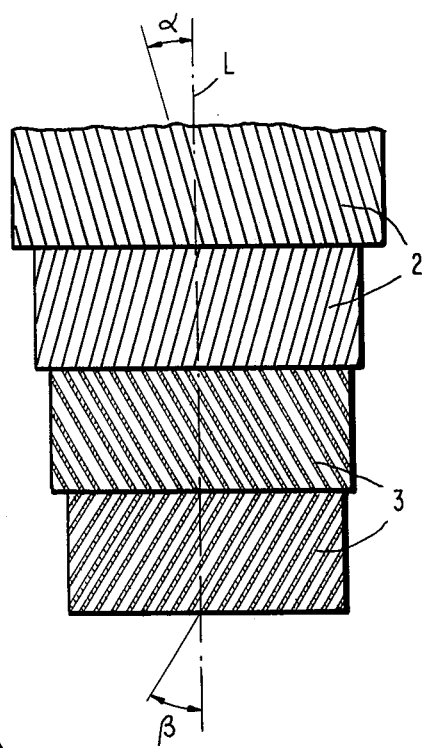
FIG. 2 is a schematic view showing the manner of arrangement of orientation of the belt plies in the breaker layer of the pneumatic tire in FIG. 1.

In one embodiment of the tire according to the invention, two plies of steel cord are used and outside the layers of steel cord two plies of textile fiber cords are employed. The breaker layer in this embodiment is constructed, as shown in FIG. 2, in such a manner that the two plies of the steel cords (3) are arranged so as to cross each other in opposite directions at an angle of $\beta$ ranging from 15° to 25° with respect to the mid-circumferential line L of the tire and the two plies of the textile fiber cords (2) are arranged in the breaker layer outside the plies so as to cross each other in opposite directions at an angle of $\alpha$ ranging from 10° to 20° with respect to the mid-circumferential line L of the tire.

Figure 3:
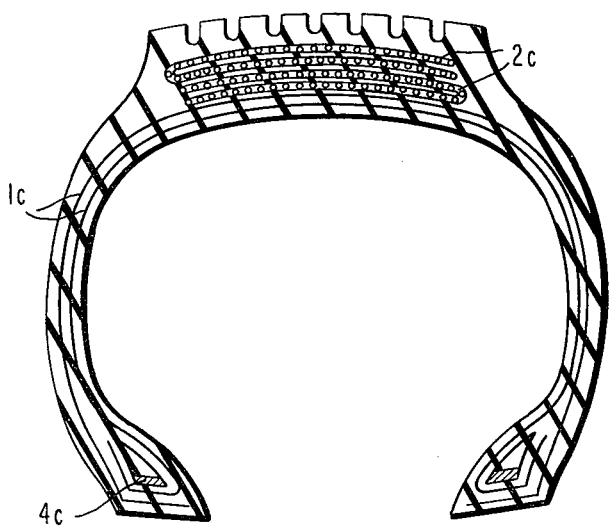
FIG. 3 is a view similar to FIG. 1 showing a radial sectional view of a conventional radial ply tire.

FIG. 3 shows, by way of comparison, one example of a conventional radial ply tire which comprises two plies of cords in a carcass layer and four plies of cords in a breaker layer. In the figure, the reference numeral (1c) represents rayon cords in the carcass layer, the reference numeral (2c) represents four plies of rayon cords in the breaker layer and the reference numeral (4c) represents bead wires.

In an alternative embodiment of the radial ply tire of this invention the tire comprises a carcass, a tread and a breaker layer in which the breaker layer consists of rubberized cord layers comprising two inside cord layers composed of steel cords and at least one outside cord layer of polyvinyl alcohol fiber cords and the plies of the carcass comprises polyester fiber cords. Just as in the above described embodiment, the same kinds of cords cross each other in the breaker layer and also the polyvinyl alcohol fiber cords have an angle of inclination $\alpha$ of 10° to 20° with respect to the equatorial line of the tire. In this embodiment with the use of polyvinyl alcohol fiber cords as the textile cords in the breaker layer and with the use of polyester fiber cords as the carcass plies, the angle $\beta$ of the steel cords with respect to the equatorial line L of the tire can be expanded to 30°, i.e., can be 15° to 30°. As in the above embodiment, where multiple layers of polyvinyl alcohol fiber cord are employed, separate layers are employed outside the steel cords to achieve the balance in strength desired in a tire as described above.

Polyvinyl alcohol fiber cords have good water resistance and a high Young's modulus and this can provide both strength to the breaker layer as well as protection to the steel cord layers in the breaker layer. Polyester fiber cords are highly stable to water, have a very low water content in the standard state of 0.4 to 0.5 percent by weight and when used as the cords for the carcass plies provide the durability needed for service at high speeds over 200 Km/hour. Using this combination of polyvinyl alcohol fiber cords as a protective layer in the breaker layer outside the two layers of steel cords and using polyester fiber cords as the carcass plies, only one polyvinyl alcohol fiber cord layer is required although additional advantages can be obtained with additional layers of polyvinyl alcohol fiber cord.

A comparison was made between the pneumatic tires according to the invention as illustrated in FIG. 1 in which the breaker layer consists of two layers of polyvinyl alcohol fiber cords radially outward of two layers of steel cords and the conventional pneumatic tires as shown in FIG. 3, both of which were made up under the identical conditions in a tire size of 175 SR 14, by carrying out drum tests under the condition of: a load of 475 Kg, and an air pressure of 2.2 Kg/cm².

The results obtained are shown in Table 1 given below. The drum tests were performed in the following procedure: Both of the tires were preliminarily run on drums at an initial speed of 80 Km/hour for one hour, and then run at stepwise elevated speeds for every 30 minutes in turn, namely 120, 128, 136, 144, 152, 160, 168, 176 and 184 Km/hour. And they were finally run at a speed of 200 Km/hour till any defect occured, at this time the period of time taken for the running at the speed was recorded.

In the drum test, the test tires, A, B, C and D refer to the pneumatic tires according to the invention, while the test tires, E, F, G and H are the conventional pneumatic tires.

Table 1

| Test Tire | Speed at Which Any Defect Occurred (Km/hour) | Period of Time Taken for the Running at the Speed at Which Any Defect Occurred | Nature of Defect |
| --- | --- | --- | --- |
| A | 200 | 9 hours and 25 minutes | tread chunking |
| B | 200 | 10 hours | nothing |
| C | 200 | 10 hours | nothing |
| D | 200 | 10 hours | nothing |
| E | 200 | 15 minutes | tread separation |
| F | 200 | 8 minutes | tread separation |
| G | 200 | 30 minutes | tread separation |
| H | 200 | 2 minutes | tread separation |

As can be seen from the results contained in above table, the pneumatic tires constructed according to the invention have a remarkable durability at high speed running with no defects even after they were run at a speed of 200 Km/hour for 10 hours.

Figure 4:
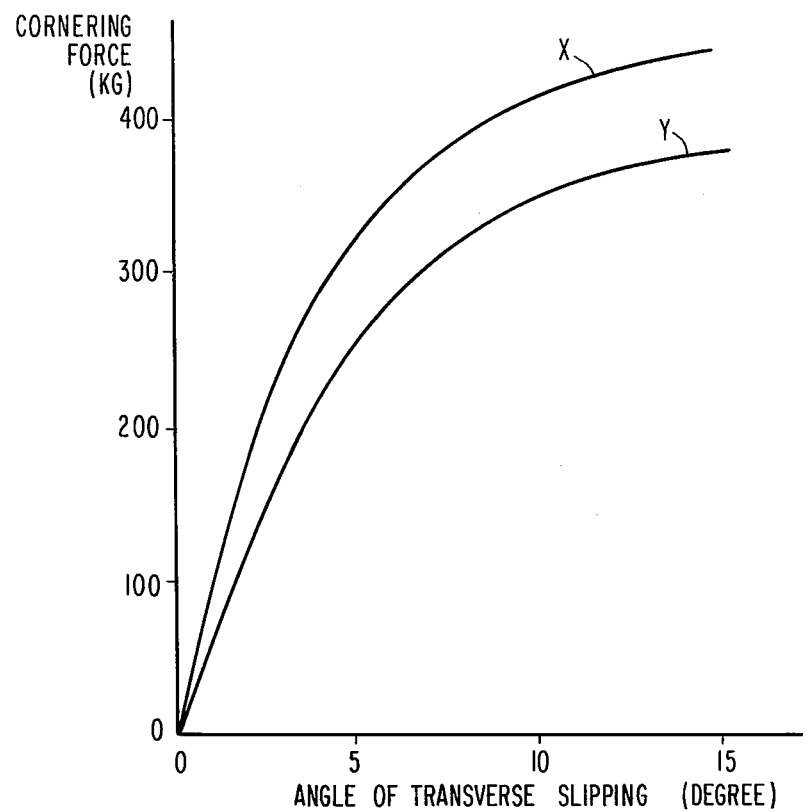
FIG. 4 is a diagrammatical view showing cornering properties of the tire according to the invention in comparison with that of a conventional tire.

Similarly, comparison was also made between both kinds of tires with respect to cornering properties and the results obtained are shown in FIG. 4. In that figure, the rectangular co-ordinates are so drawn that the abscissa represents the angle of transverse slipping and the ordinate represents the cornering force, and the designation X is the curve for the pneumatic tires according to the invention and the designation Y is the curve for the conventional pneumatic tires. The comparative tests were performed on tires having an air pressure of 1.9 Kg/cm³. As is apparent from the curves of FIG. 4 showing the comparative diagram of cornering properties, the pneumatic tires of the invention also have much more advantageous cornering properties.

In the following comparison, six radial-ply tires each with a size of 175 SR 14 were built using a carcass layer of 2 ply rayon cords (1650 d/2) and a breaker layer including rayon cords and steel cords which shared the strength of the breaker layer at varying proportions J, K, L, M, N and P as shown in Table 2 below. Various characteristics of these tires were compared. The strength was measured in the direction of the cords. Although in this example, rayon cords were used as the textile cords, various synthetic fibers such as polyesters or polyvinyl alcohol can be used as cord fabrics.

Table 2

| Test Tires | J | K | L | M | N | P |
|---|---|---|---|---|---|---|
| Proportion of strength shared by the rayon cords (%) | 100 | 63 | 50 | 40 | 26 | 0 |
| Proportion of strength shared by the steel cords (%) | 0 | 37 | 50 | 60 | 74 | 100 |

Note:
(1) The breaker layer of tire J consisted only of 4 ply rayon cords (1650 d/3).
(2) Tires K, L, M and N had a breaker layer consisting of 2 ply rayon cords and 2 ply steel cords. Changes in the proportion of strength shared by the cords were brought about by varying the density of the cords. Generally, however, it is of course possible to effect these changes also by varying the structure of the cords, the type of the filaments, the fibers used, etc., and conditions suitable for the respective tires can be chosen.
(3) Tire P had a breaker layer consisting only of 4 ply steel cords (3 × 3).

Each of the test tires was mounted on an automobile, and the automobile was driven on a city road (relatively good road) at a speed of 40 to 60 Km/hour. The abrasion resistance of tire J was set as 100, and the indices of abrasion resistance of the other tires were determined and are shown in Table 3.

Table 3

| Test Tires | J | K | L | M | N | P |
|---|---|---|---|---|---|---|
| Index of Abrasion Resistance | 100 | 110 −120 (116) | 130 −170 (154) | 150 −190 (176) | 160 −200 (182) | 170 −210 (195) |

Note: The values in the parentheses are average values obtained.

As is clear from the results contained in Table 3, when the shared strength proportion of the steel cords is 60 percent, the abrasion resistance of the tire is improved by about 76 percent in comparison with the tire in which the strength of the breaker layer is borne by the rayon cords alone.

The abrasion phenomenon occurs due to slippage that takes place between the road surface and the portion of the tire contacting the road surface. Since radial-ply tires generally have reduced slippage in the circumferential direction (i.e., in the running direction), it is believed that they have better abrasion resistance than bias tires. However, with the radial-ply tires now in use, there is a very great difference in abrasion resistance between those having a breaker layer of textile cords and those having a breaker layer of steel cords. The above experiment shows that even when the steel cords are partly replaced by textile cords, only a slight reduction in abrasion resistance results. This is believed to be due largely to the non-compressive effect of the steel cords.

The cornering properties of the test tires were compared, and the results obtained shown in Table 4 below. The cornering properties of tire J was set as 100, and the cornering properties of the other test tires were expressed as indices thereof.

Table 4

| Test Tires | J | K | L | M | N | P |
|---|---|---|---|---|---|---|
| Cornering power index | 100 | 110 | 130 | 140 | 145 | 150 |

The results shown in Table 4 also show similar trends to the abrasion resistance values shown in Table 3. All of the tires L, M and N showed cornering properties which tended to approach that of the tire whose breaker layer consisted only of steel cords, and it was made clear that the effect of steel cords appeared more strongly. This improvement in cornering properties is an important factor that leads to the stability of the tire during high speed driving.

The riding comfort indices of the test tires are shown in Table 5.

In the case of radial-ply tire, the riding comfort index is generally evaluated at the same time of running over a projecting object. The riding comfort value of the tire A in which the breaker layer consisted only of textile cords was set as 100, and those of the other test tires were expressed by indices in comparison with it.

Table 5

| Test Tires | J | K | L | M | N | P |
|---|---|---|---|---|---|---|
| Riding comfort index | 100 | 99 | 98 | 96 | 88 | 85 |

The indices given in Table 5 show that the riding comfort of the test tire P whose belt layer consisted only of steel cords is certainly inferior to that of the test tire J whose belt layer consisted only of textile cords. The reason is that the ability of the tire to envelop the projecting object (enveloping effect) depends upon the rigidity, that is the elasticity, of the breaker layer. It has been found that a reduction in riding comfort can be prevented by the specified combination of textile cords and steel cords arranged at different angles of inclination with respect to the circumferential direction. The inclination angle of the textile cords with respect to the equatorial line of the tire should be in the range of 10° to 20°, and the inclination angle of the steel cords should be in the range of 15° to 25°. It has also been found that better riding comfort can be obtained by making the inclination angle, with respect to the equatorial line of the tire, of the steel cords at least about 5° larger than the inclination angle of the textile cords, although this angle depends upon the proportion of the steel cords and the textile cords in a specified combination.

The results of the various tests given above show that the specific combination of steel cords and textile cords arranged at different angles of inclination with respect to the equatorial line of the tire leads to improved abrasion resistance and cornering properties yet barely impair the riding comfort.

Since steel cords and textile cords which have a greatly different modulus of elasticity from each other are used to make up the breaker layer, it is necessary to use rubbers having a different modulus for embedding the cords. Experiments show that by embedding the steel cords in rubber having a 100 percent modulus of as high as 50 to 70 Kg/cm², the abrasion resistance and cornering properties of the resulting tire are improved, and that by embedding the textile cords in rubber having a smaller 100 percent modulus of 40 to 50 Kg/cm², shock from a road surface can be reduced, riding comfort is improved, and the occurrence of tread separation can be reduced.

We have also found that if the embedding rubbers have a 100 percent modulus outside the above-specified ranges, the above-described effects are reduced by one half.

Figure 5:
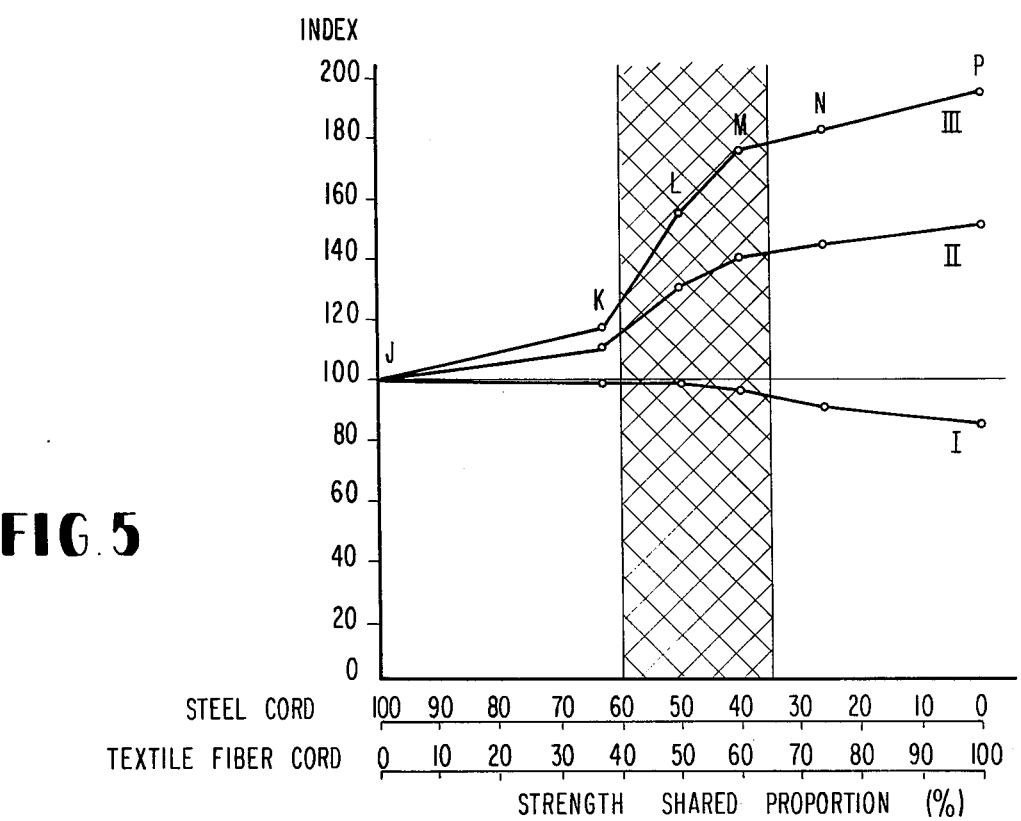
FIG. 5 is a graphic representation showing the variations of the characteristics of the radial-ply tire in a specific example of the radial-ply tire of this invention.

The above test results are shown by the characteristic curves in FIG. 5. These characteristic curves show that the strength shared proportion of the steel cords and textile cords, where two layers of steel cords and two layers of textile fiber cords are used, is preferably in the range of 40 to 65%, as shown by the hatched portion of FIG. 5, within which range the cornering properties and the abrasion resistance of the tire are remarkably improved without reducing the riding comfort very much. In FIG. 5, the abscissa represents the strength shared proportion, in percent, of the steel and textile cords, and the ordinate represents the indices of the respective properties of the test tires J, K, L, M, N and P, curve I showing the variations in the riding comfort indices of the test tires, curve II showing the variations in the cornering properties indices of the test tires, and curve III showing the variations in the abrasion resistance indices of the test tires.

While the invention has been described in detail and in terms of specific embodiments thereof it will be apparent that various changes and modifications can be made therein without departing from the spirit and scope thereof.

What is claimed is:

1. A radial-ply tire comprising a carcass, a tread and a breaker layer, said breaker layer consisting of four rubberized cord layers comprising two separate outside cord layers composed of textile fiber cords and two inside cord layers composed of steel cords, the same kinds of cords crossing each other, said textile fiber cords having an angle of inclination of 10° to 20° with respect to the equatorial line of said tire and said steel cords having an angle of inclination of 15° to 25° with respect to said equatorial line, said steel cords sharing 40 to 65 percent of the entire strength of said breaker layer, the angle of inclination of said steel cords with respect to said equatorial line being at least 5° larger than the angle of inclination of said textile fiber cords with respect to said equatorial line, wherein the rubber for embedding said textile fiber cords has a 100 percent modulus of 40 to 50 Kg/cm² and the rubber for embedding said steel cords has a 100 percent modulus different from the 100 percent modulus of said rubber for embedding said textile fiber cords and is of 50 to 70 Kg/cm².

2. A radial-ply tire comprising a carcass, a tread and a breaker layer,
    said breaker layer consisting of rubberized cord layers comprising two inside cord layers composed of steel cords and at least one outside cord layer of polyvinyl alcohol fiber cords, the same kinds of cords crossing each other, said polyvinyl alcohol fiber cords having an angle of inclination of 10° to 20° with respect to the equatorial line of said tire and said steel cords having an angle of inclination of 15° to 30° with respect to said equatorial line, providing that when more than one polyvinyl alcohol fiber cord layer is present said fiber layers are separate layers, and the plies of said carcass being polyester fiber cords, the angle of inclination of said steel cords with respect to said equatorial line being at least 5° larger than the angle of inclination of said polyvinyl alcohol fiber cords.

3. The radial-ply tire of claim 2, wherein the rubber for embedding said polyvinyl alcohol fiber cords has a 100 percent modulus of 40 to 50 Kg/cm² and the rubber for embedding said steel cords has a 100 percent modulus of 50 to 70 Kg/cm².

* * * * *